Dec. 12, 1950  M. EL SHISHINI ET AL  2,533,566
HIGH-FREQUENCY HARMONIC ANALYSER
Filed Nov. 5, 1946  2 Sheets-Sheet 1
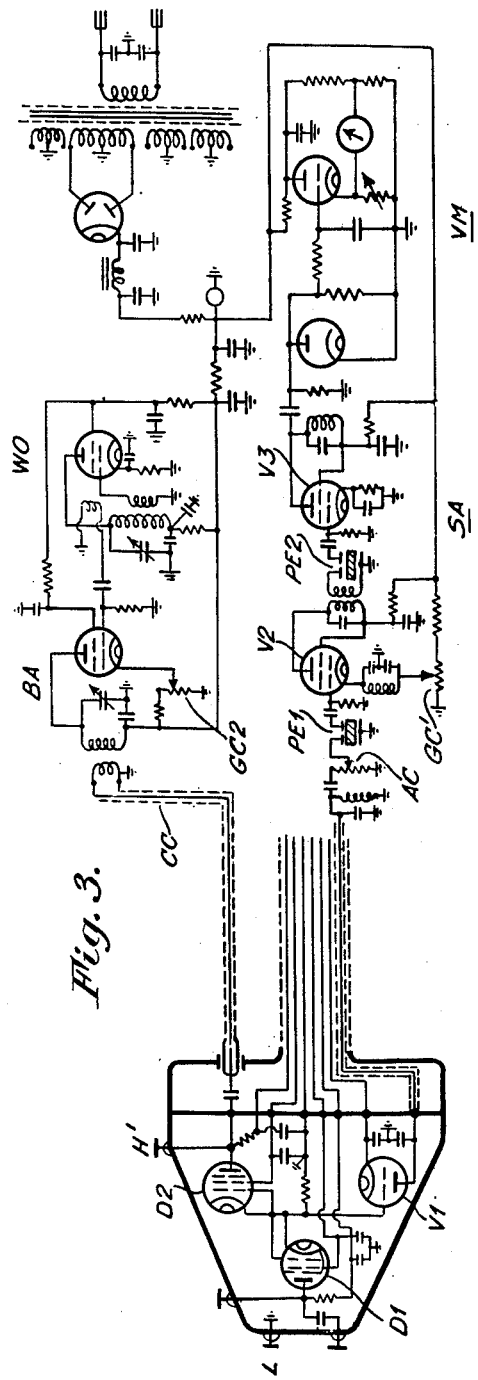
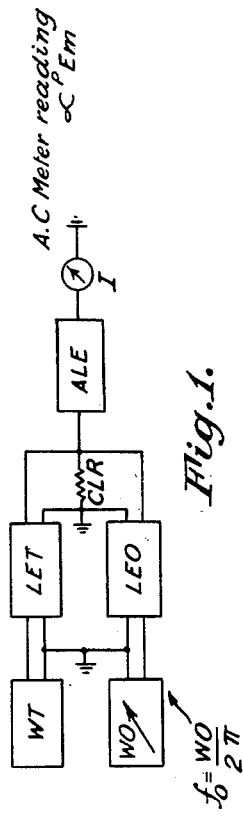

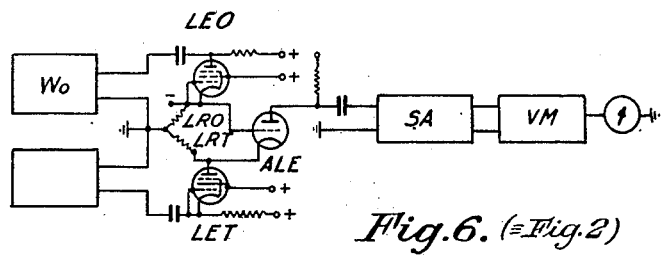
Fig.6. (=Fig.2)
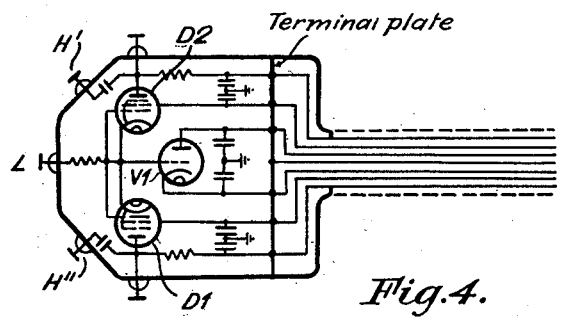
Fig.4.
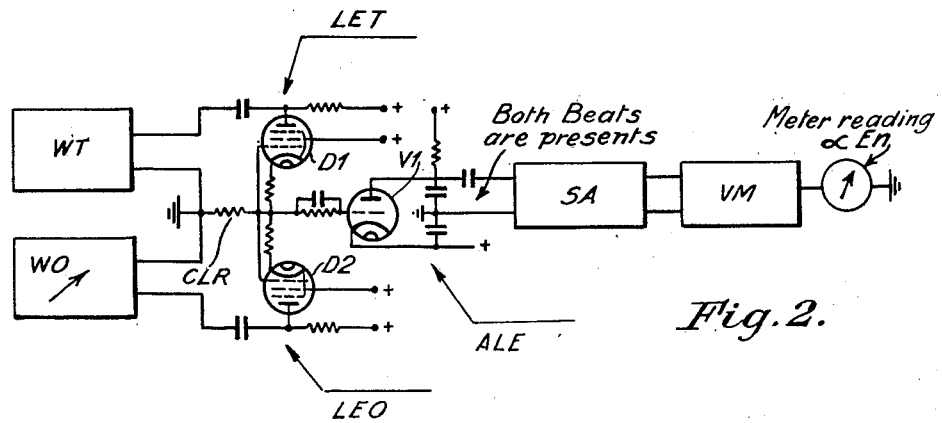
Fig.2.
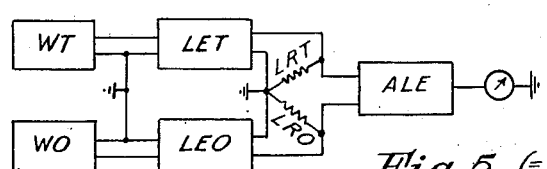
Fig.5. (=Fig.1.)
Inventors: M. El Shishini
and M. A. H. El Said,
By Baldwin + Wight, Attorneys Patented Dec. 12, 1950

2,533,566

UNITED STATES PATENT OFFICE 2,533,566

HIGH-FREQUENCY HARMONIC ANALYZER

Mahmoud El Shishini and Mohamed Abdu
Hassan El-Saïd, Giza, Cairo, Egypt

Application November 5, 1946, Serial No. 707,874
In Great Britain January 11, 1946

9 Claims. (Cl. 175—183)

This invention relates to high-frequency wave analysers.

For the purposes of the present invention, it may be said that wave analysers are intended for the measurement of individual periodic components of a complex wave of potential. Such components may have amplitudes varying from low levels to relatively high levels and may have frequencies close to each other or related in harmonic order.

Most known wave analysers, in which a vacuum tube is the most important element, mainly depend for their operation upon the parabolic plate-current/grid voltage characteristic of the tube. This usually necessitates that any resistance in the plate circuit of the tube, including the internal resistance of the source of plate current be kept low: consequently the output voltage is also low. This impairs the stability and constancy of the characteristics and implies battery operation. Moreover, if the characteristic of the tube is not parabolic, undesirable low-frequency components make their appearance in the output, and these components affect the accuracy of the analyser to an extent which depends upon the extent of departure from the theoretical law.

If, to eliminate the undesirable low-frequency components, a push-pull arrangement of tubes is used, third-harmonic components appear in an additive manner. Moreover, it is difficult to ensure identity of characteristics as between the tubes.

Again, applying a tested complex wave, in series with the signal from a local oscillator, to the grid of a tube requires input transformers which have uniform response over the band of frequencies to be tested, and special arrangements have to be made to decouple the local oscillator circuit from the tested signal circuit so as to prevent any serious interference. This adds to the complications involved in the construction of such wave analysers and the frequency range is seriously limited.

The present invention, which may be said to be an extension of the invention contained in our copending application Serial No. 677,666, filed June 19, 1946, now U. S. Patent No. 2,486,068, granted October 25, 1949, comprises a wave analyser operating on the principle of logarithmic and antilogarithmic multiplication which principle is free from drawbacks and difficulties in construction common to other types of wave analysers, and provides for a direct means for measuring the amplitude of any required component in a tested complex wave.

The present invention is based upon the fact, that the two beat frequencies of any two independent signals can be developed by multiplying the two independent signals; the multiplication in this invention is obtained by logarithmic and antilogarithmic processes originally disclosed in our U. S. Patent No. 2,486,068.

According to the present invention, a high-frequency wave analyser includes a circuit arrangement having a first input circuit to which a potential wave for analysis is applied to produce an output having an instantaneous logarithmic relationship to said potential wave, a second input circuit to which a sinusoidal oscillatory potential wave is applied to produce an output having instantaneous logarithmic relationship to said oscillatory potential, a load circuit to which both said outputs are applied and in which they are combined, a further circuit arrangement having an input circuit to which said combined outputs are applied, said further circuit being adapted to produce a final output having an instantaneous exponential (antilogarithmic) relationship to said combined outputs, and an indicator to which said final output is applied.

If necessary or desired, the final output may be amplified before application to the said indicator.

According to the invention, said final output constitutes a repeating term of the tested complex wave, a repeating term of the sinusoidal signal from the local oscillator, and a multiplication term of the tested complex wave into local sinusoidal signal; wherein said final multiplication output is obtained by the superimposition of the sum of the instantaneous logarithms from said first and second input circuits upon the instantaneous antilogarithm (exponential) of said further circuit.

The final output is applied to said indicator through a circuit tuned to pass the beat frequency.

Preferably the tuned circuit is fixed-tuned and the source of oscillatory potential is variable in frequency so that particular components of the potential wave may be investigated by applying an oscillatory potential having a certain frequency which oscillatory potential when multiplied with the said particular component of the potential wave will produce a beat component having a frequency equal that to which the selective circuit is fixed-tuned.

The invention will be further described in connection with the accompanying drawings:

Figure 1 is a schematic diagram,

Figure 2 illustrates a circuit arrangement for the logarithmic and exponential elements of the basic measuring circuit, Figure 3 is a circuit diagram for the purpose of illustrating the operation of a wave analyser according to the invention, Figure 4 is an alternative arrangement for part of the circuit illustrated in Figure 3.

Figures 5 and 6 correspond respectively with Figures 1 and 2 and relate to an alternative arrangement of the basic measuring circuit illustrated therein.

Referring to Figure 1, the wave analyser according to the invention consists, essentially, of a first logarithmic element LET to which a complex wave $e$ from, for example source WT, is fed and whose output has an instantaneous logarithmic relationship to said complex wave, of a second logarithmic element LEO to which a locally produced sinusoidal oscillatory wave $e_0$ of frequency $\omega_0/2\pi$ from source WO, is fed and whose output has an instantaneous logarithmic relationship to said oscillatory wave, a common load resistor CLR for the two logarithmic elements in which the two above outputs are added linearly, and an antilogarithmic element ALE to which the drop of potential across resistor CLR is applied and whose output has an instantaneous exponential relationship to said drop of potential. This output contains two components having frequencies corresponding to the two beat frequencies of the tested component in the complex wave $e$ and the oscillatory wave $e_0$, respectively from sources WT and WO. When the frequency $\omega_0/2\pi$ of the local oscillator is adjusted with respect to any of the component frequencies of the tested complex wave, the antilogarithmic element gives an output which includes the two beat frequency components generally represented by:

$K.E_0.E_n. \cos (\omega_0+\omega_n)t$ upper beat component and $K.E_0.E_n. \cos (\pm\omega_0\mp\omega_n)t$ lower beat component when $n$ indicates the order of the tested component frequency in the complex wave and K is an overall constant depending upon circuit adjustments. The amplitudes of the beat frequency terms are proportional to the amplitude of the local oscillator signal into the amplitude of the tested component in the complex wave. Either of the above beat frequency components can be selected, amplified if necessary, and indicated. The value of $E_0$ can be measured by means of a vacuum tube voltmeter. Such constants and others are usually included in the final overall calibration of the analyser. The two logarithmic elements, respectively LET and LEO, consist of two thermionic tubes connected as diodes, the first mentioned being connected to the source of complex wave and the second mentioned being connected to the source of oscillatory potential.

These two tubes are preferably pentodes operated as polarised diodes the screen grids and suppressor grids serving to convert the characteristics of the tubes from exponential to logarithmic.

Referring to Figure 2, it should be understood that the two pentodes $D_1$ and $D_2$ are initially set to operate in a region such that cathode current at any instant plotted to a linear scale against plate to ground potential at any instant plotted to a logarithmic scale results in a straight line relationship. Also, and referring to Figure 6, the pentode incorporated in the element LET is initially set to operate in a region such that plate current at any instant plotted to a linear scale against cathode to ground potential at any instant plotted to a logarithmic scale results in a straight line relationship. Obviously the operation of the pentode incorporated in the element LEO of Figure 6 is the same as $D_1$ in Figure 2.

The antilogarithmic (exponential) element may include a diode polarised to operate on the exponential portion of its characteristic, or it may include a variable $\mu$ valve. A tube operated as an antilogarithmic element is one which is operating on a portion of the well known exponential characteristic of thermionic tubes.

Figure 2 illustrates, in greater detail, a circuit arrangement according to the invention.

In Figure 2, the two logarithmic elements, respectively LET and LEO, include, respectively pentodes $D_1$ and $D_2$ connected to the source WT of complex wave under test and to the source WO of oscillatory potential wave. The output currents from both logarithmic elements LET and LEO circulate in a circuit which includes common load resistor CLR where the currents which bear instantaneous logarithmic relationships to the potentials respectively applied between their anode and ground are added. Element ALE includes a variable $\mu$ tube $V_1$ across the grid/cathode space of which the potential developed across resistor CLR is applied. A selective amplifier SA is included in the output circuit of tube $V_1$. This serves to select the beat component in the output of tube $V_1$, which beat component is the result of the multiplication of the tested component in the complex wave into the locally produced oscillatory wave. The selected beat component is fed to a vacuum tube voltmeter VM.

The higher beat component in the output of the antilogarithmic element ALE is, as above shown, expressed by $K.E_0.E_n. \cos (\omega_0+\omega_n)t$ and the lower beat component in the output is expressed by $K.E_0.E_n. \cos (\pm\omega_0\mp\omega_n)t$ The selective amplifier SA may be initially designed to select only one of these beat components.

If the selective amplifier SA is designed to select the higher beat, which means that the selective frequency $\omega_s/2\pi$ is equal to or higher than the highest frequency of components in the wave to be tested, then $$\frac{\omega_s}{2\pi}=\frac{\omega_0}{2\pi}+\frac{\omega_n}{2\pi}$$

When $$\frac{\omega_n}{2\pi}=0$$

the local oscillator should be adjusted to a frequency equal to the selective frequency, and when $$\frac{\omega_s}{2\pi}=\frac{\omega_n}{2\pi}$$

the local oscillator is to be adjusted to zero frequency. Of course, the lower frequency boundary of the local oscillator is limited by the selectivity of the filter circuit used, while the upper frequency boundary is limited by the lowest frequency to be analysed. Since the output does not contain any higher order harmonics of the input frequencies, it is clear that this type of wave analyser is able to analyse the whole frequency range included between zero and the selective frequency. This is in contradistinction to other wave analysers using the parabolic portion of the tube characteristics, where the presence of the second harmonic components in the output limits seriously the working frequency range to an upper limit less than half the selective frequency of its filter circuit.

Again, if the selective amplifier circuit SA is adjusted to select the lower beat component, which means that the selective frequency is equal to or lower than the lowest frequency to be tested, then $$\frac{\omega_s}{2\pi}=\left(\pm\frac{\omega_0}{2\pi}\mp\frac{\omega_n}{2\pi}\right)$$

This shows that for one frequency to be tested, there are two adjustments of the local oscillator frequency which produce a beat component having a frequency equal to the selective frequency. Such an arrangement, of course, suffers from double beat points, and when the tested complex wave form contains components having frequencies which are near each other by an amount of the order of the selective frequency, serious interference takes place due to the two components having frequencies which are separated from the local oscillator frequency by an amount equal to the selective frequency of the filter circuit used. For this reason, this method is inadequate unless the fundamental frequency of the complex wave form is greater than twice the selective frequency and that the constituent components have frequencies separated by a frequency band of not less than twice the selective frequency.

In order to analyse a complex wave whose components have frequencies related only in harmonic order, the selectivity need only be sufficiently high to discriminate between the fundamental and the second harmonic. As the fundamental frequency becomes lower, the requirement of higher selectivity becomes necessary. But when the complex wave is composed of a spectrum of frequencies close to each other, it is necessary to provide high selectivity. In this case, crystal resonators are preferable, and can be used in a single section or in aligned multi-sections. On the other hand, as the selectivity becomes higher, it is necessary to provide high stability of frequency for the local oscillator and a reliable means for accurately adjusting the frequency of the local oscillator.

Figure 3 shows the circuit of tuned amplifier SA in greater detail. As shown in Figure 3 it consists of two sections connected in cascade. The first section includes a three-electrode piezo-electric crystal PE1, resonant at a frequency which is arbitrarily chosen for convenience to be the selective frequency and a tube V2 having its anode circuit tuned to approximately the selective frequency. The beat component output from antilogarithmic element V1 is coupled to the grid of tube V2 by crystal PE1. The second section includes a three-electrode piezo-electric crystal PE2, also resonant at approximately the selective frequency, and a tube V3 having its anode circuit tuned to the same frequency. The beat component output from tube V2 is coupled to the grid of tube V3 by means of the tuned anode circuit of tube V2 and crystal PE2. The output of tube V3 is coupled to a vacuum tube voltmeter unit VM of conventional form. It is desirable to design the amplifier such that it provides for a small band-pass action mainly to facilitate the adjustment of the local oscillator frequency.

Figure 3 also illustrates a general assembly of the various elements of the analyser, in a housing and one manner of connecting the local oscillator.

It is a matter for the designer whether the local oscillator shall be housed in the instrument itself or whether it shall be separate. In the first case, illustrated in Figure 3, the measuring head has only two terminals L and H', (with one, namely L, grounded) for the tested circuit, and the connection between the local oscillator circuit WO and the tube D2 of its corresponding logarithmic element may be made through a plug-in coaxial cable, CC.

In the second case, illustrated in Figure 4, the measuring head unit would have three terminals, L, H', and H'', one, namely, L, as a common ground, the second connected to the high potential lead of the separate oscillator, and the third to the high potential lead of the tested circuit.

As to the transmission of the alternating output of the antilogarithmic element from the measuring head to the amplifier at the input of the selective filter circuit, it is necessary, when the selective frequency is high enough, to take into consideration the transmission characteristics of the output screened plate lead. Such transmission characteristics can easily be calculated and taken into account or can be compensated since only the fixed selective frequency is of importance.

As to the construction of the selective amplifier SA or filter, it is preferable to use crystal resonators in multi-sections, the first of which should be placed in the output circuit of the antilogarithmic element ALE. Two sections are usually sufficient, and it may be necessary slightly to damp one section electrically in order to make the alignment less critical. Selective feed-back may be allowed through cathode circuits as shown for tube V2, to improve the overall selectivity.

The indicating instrument I is essentially a vacuum tube voltmeter connected to the termination of the selective amplifier. The indication may be made linear or logarithmic according to requirements, and it is preferable to use a direct current amplifier stage provided with a controlled meter multiplier. For logarithmic indication, use may be made of the rectification characteristic of the unpolarised logarithmic elements.

The logarithmic scale may be directly calibrated in decibels or in R. M. S. volts.

Although, as described, the selective amplifier SA is fixed-tuned, and the local oscillator is of variable frequency so as to produce by logarithmic and antilogarithmic multiplication of its output with a particular component of the complex wave, a beat component, final output to which the selective amplifier is tuned, the selective amplifier may, instead, be variably tunable and the local oscillator of fixed frequency so that a particular component is brought under investigation by selecting the beat component final output produced by logarithmic and antilogarithmic multiplication of the unique oscillatory wave of said oscillatory potential and said particular component. In this case, the gain of the tunable selective amplifier should be constant and its selectivity high over the whole of its used frequency band; it should also be frequency calibrated.

Wave-analysers are usually subjected to a large variation in the amplitude of the components of the tested complex wave form, and might also be subjected to a large variation in the level of the tested wave as a whole. Consequently, some form of wide control must be provided, and for best sensitivity of the indicating instrument, it is essential to provide various controls wherever possible, since this provides a means for attaining high degree of accuracy.

In the first place, the selective amplifier is provided with two controls, one AC, Figure 3, used as a calibrated variable attenuator at its input and the other GC' used as a calibrated variable gain control introduced in the cathode circuit of one of the variable $\mu$ amplifiers.

In the second place, an attenuator may be provided at the input of the tested complex wave form, and is used only when the level of the tested signal is greater than the specified, input of the corresponding logarithmic element. The design of this attenuator should be carried out carefully taking into consideration its frequency characteristics and the effect of the input impedance of the connected logarithmic element.

One further control can be provided in the direct-current amplifier stage of the indicating voltmeter connected to the termination of the selective amplifier.

By proper manipulation of these controls, the wave analyser can discriminate well between the lowest and the highest amplitudes of the components of the tested wave.

In order that direct feed-back, which may result from the use of a common load resistor CLR for the logarithmic elements, shall not cause interference between the tested complex wave $e$ and the local sinusoidal oscillation $e_0$; the common load resistor CLR is replaced by two separate resistors LRT and LRO, as shown in Figures 5 and 6 which otherwise correspond with Figures 1 and 2. It is not thought to be necessary further to describe these figures: the principle involved will be understood by those skilled in the art, and is referred to in our said U. S. Patent No. 2,486,068.

It is not essential to use crystal resonators for obtaining a high degree of selectivity and stability. Ordinary resonant lumped L–C circuits may be used in the plate circuits for loading the amplifiers, and in the cathode circuits for selective feed-back. With such arrangement, it is thought that high selectivity can be obtained particularly when the fixed frequency of the selective amplifier is sufficiently high.

An analyser as described is capable of analysing a complex wave, formed from a spectrum of frequencies which may be close to each other or harmonically related, the amplitude of a selected component of which is to be measured, or it may be a simple harmonic wave, the amplitude of which is to be measured.

What we claim is:

1. A wave analysing circuit wherein wave analysis is effected by combining logarithmic and exponential characteristics realized by electron discharge devices, comprising a first electron discharge device to which a voltage wave is applied for analysis, said first electron discharge device being adjusted to operate to produce a first output current therefrom which output current has at any instant a logarithmic relationship to said applied voltage wave, a second electron discharge device to which a sinusoidal oscillation is applied to which said second electron discharge device is adjusted to operate to produce a second output current therefrom which has at any instant a logarithmic relationship to said applied oscillation, an impedance in which said first and second output currents are combined, a third electron discharge device to which said combined output currents are applied and which third electron discharge device is adjusted to operate to produce a third output current therefrom which has at any instant an exponential relationship to said combined output currents from said first and second electron discharge devices, and means for adjusting said impedance such that said third output current is at any instant proportional to the product of said applied voltage wave and said sinusoidal oscillation.

2. A wave analysing circuit comprising a first electron discharge device initially polarized such that its output current bears at any instant a logarithmic relationship to its input voltage and having a pair of input and a pair of output terminals, a second electron discharge device initially polarized such that its output current bears at any instant a logarithmic relationship to its input voltage and having a pair of input and a pair of output terminals, a resistor, means connecting a complex wave potential for analysis to said input terminals of said first electron discharge device, means connecting a sinusoidal wave potential to said input terminals of said second electron discharge device, means connecting one of said output terminals of each electron discharge device to one end of said resistor, means connecting the other of said output terminals of each electron discharge device to the other end of said resistor, a third electron discharge device initially polarized such that its output current bears at any instant an exponential relationship to its input voltage, said third electron discharge device having input and output terminals, means connecting one input terminal of said third electron discharge device to one end of said resistor, means connecting the other input terminal of said third electron discharge device to the other end of said resistor, and means for adjusting said resistor such that the output current of said third electron discharge device is proportional to the instantaneous multiplication of said complex wave for analysis into said sinusoidal wave.

3. A wave analysing circuit comprising a first electron discharge device initially polarized such that its output current bears at any instant a logarithmic relationship to its input voltage and having a pair of input and a pair of output terminals, a second electron discharge device initially polarized such that its output current bears at any instant a logarithmic relationship to its input voltage and having a pair of input and a pair of output terminals, a source providing a complex wave potential, a first resistor and a second resistor, said first and second resistors having one common terminal and each having an individual terminal, means connecting a complex wave potential to said input terminals of said first electron discharge device, means connecting a sinusoidal wave potential to said input terminals of said second electron discharge device, means connecting one output terminal of said first electron discharge device to the individual terminal of said first resistor and the other output terminal of the same to the common terminal of said first and second resistors, means connecting one output terminal of said second electron discharge device to the individual terminal of said second resistor and the other output terminal of the same to said common terminal of said first and second resistors, a third electron discharge device initially polarized such that its output current bears at any instant an exponential relationship to its input voltage and having a pair of input and a pair of output terminals, means connecting each input terminal of said third electron discharge device to a different one of said individual terminals of said first and second resistors, and means for adjusting said resistors such that the output current of said third electron discharge device is proportional to the instantaneous multiplication of said complex wave for analysis into said sinusoidal wave.

4. An analysing circuit as set forth in claim 2 wherein said first and said second electron discharge devices each comprises one thermionic tube having at least a cathode, a control grid, a plate and at least one grid therein between said control grid and said plate, said thermionic tube being set and adjusted to operate such that its cathode current varies logarithmically with respect to its plate voltage, and wherein said third electron discharge device comprises another thermionic tube having at least a cathode, a control grid and a plate, said other thermionic tube being set and adjusted to operate such that its plate current varies exponentially with respect to its control grid voltage, said first and second thermionic tubes being initially polarized by direct current potentials and interconnected such that their cathode currents pass through a common resistor, the voltage drop across which is applied to the control grid of said other thermionic tube, a final means for adjusting said common resistor such that the change in the plate current of said third thermionic tube consequent upon application of said complex wave and said sinusoidal oscillation is proportional to the instantaneous multiplication of said complex wave potential into said sinusoidal oscillation.

5. An analysing circuit as set forth in claim 3 wherein said first and second electron discharge devices comprise respectively a first and a second thermionic tube, in which each of said first and second thermionic tubes has at least a cathode, a control grid, a plate and at least one grid therein between said control grid and said plate, said first thermionic tube being set and adjusted to operate such that its cathode current varies logarithmically with respect to its plate voltage, said second thermionic tube being set and adjusted to operate such that its plate current varies logarithmically with respect to its plate voltage, said first resistor being connected in the cathode circuit of said first thermionic tube, said second resistor being connected in the plate circuit of said second thermionic tube, said first and second resistors being connected such as to add the voltage drops across their terminals, means for initially polarizing said first and second thermionic tubes by direct current potentials, said third electron discharge device comprising a third thermionic tube having at least a cathode, a control grid and a plate, said third thermionic tube being set and adjusted to operate such that its plate current varies exponentially with respect to its control grid voltage, said added voltage drops across said first and second resistors being applied to the control grid-cathode space of said third thermionic tube, a final means for adjusting said first and second resistors such that the change in the plate current of said third thermionic tube consequent upon application of said complex wave and said sinusoidal oscillation is proportional to the instantaneous multiplication of said complex wave potential into said sinusoidal oscillation.

6. A wave analyser comprising an analysing circuit as set forth in claim 2, including means for connecting the output of said analysing circuit to a fixed tuned beat frequency filter, means for adjusting the frequency of said sinusoidal wave potential so as to relate the beat frequency output of said filter to any desired component in said complex wave, and final means for amplifying and measuring the amplitude of the output from said beat frequency tuned filter.

7. A wave analyser comprising an analysing circuit as set forth in claim 3, including means for connecting the output of said analysing circuit to a fixed tuned beat frequency filter, means for adjusting the frequency of said sinusoidal wave potential so as to relate the beat frequency output of said filter to any desired component in said complex wave, and final means for amplifying and measuring the amplitude of the output from said beat frequency filter.

8. A wave analyser comprising an analysing circuit as set forth in claim 2, including means for connecting the output of said analysing circuit to a variably tuned beat frequency filter, and final means for amplifying and measuring the output.

9. A wave analyser comprising an analysing circuit as set forth in claim 3, including means for connecting the output of said analysing circuit to a variably tuned beat frequency filter, and final means for applying and measuring the output.

MAHMOUD EL SHISHINI.
MOHAMED ABDU HASSAN EL SAÏD.

REFERENCES CITED

The following references are of record in the file of this patent:

UNITED STATES PATENTS

| Number | Name | Date |
|---|---|---|
| 1,762,160 | Curtis | June 10, 1930 |
| 1,814,898 | Deardorff | July 14, 1931 |
| 1,976,481 | Castner | Oct. 9, 1934 |
| 1,994,232 | Schuck, Jr. | Mar. 12, 1935 |
| 2,244,369 | Martin | June 3, 1941 |